Sept. 8, 1925.  
R. D. MERSHON ET AL  
1,552,443  
WELDING ALUMINUM  
Filed July 21, 1923

Inventor  
Rolph D. Mershon.  
Percy A. Ross.  
By their Attorneys  
Cooper, Kerr & Dunham Patented Sept. 8, 1925.

1,552,443

UNITED STATES PATENT OFFICE.

RALPH D. MERSHON, OF NEW YORK, AND PERCY A. ROSS, OF YONKERS, NEW YORK; SAID ROSS ASSIGNOR TO SAID MERSHON.

WELDING ALUMINUM.

Application filed July 21, 1923. Serial No. 652,887.

*To all whom it may concern:*

Be it known that we, RALPH D. MERSHON, of New York, county and State of New York, and PERCY A. ROSS, of Yonkers, Westchester County, and State of New York, both citizens of the United States, have invented certain new and useful Improvements in Welding Aluminum, of which the following is a full, clear, and exact description.

The invention which forms the subject of the present application (in part a division of our prior and copending application Serial No. 343,266, filed December 8, 1919) relates to welding aluminum.

In prior methods for electric welding of aluminum to aluminum or to other metals it has been believed necessary that the parts to be joined be brought together by percussive engagement; or that a terminal of the source of welding current (say a charged condenser) be brought into contact with the parts at the point where the weld is to be made so that the welding current will flow between the parts and the terminal at the instant of contact. Our present invention is based on the discovery that percussive engagement of the parts, or bringing the welding terminal into contact with the joint at the instant of discharge of the condenser, is unnecessary, and that on the contrary the parts can be arranged in the desired positions and in contact with each other before the condenser is discharged.

Figure 1:
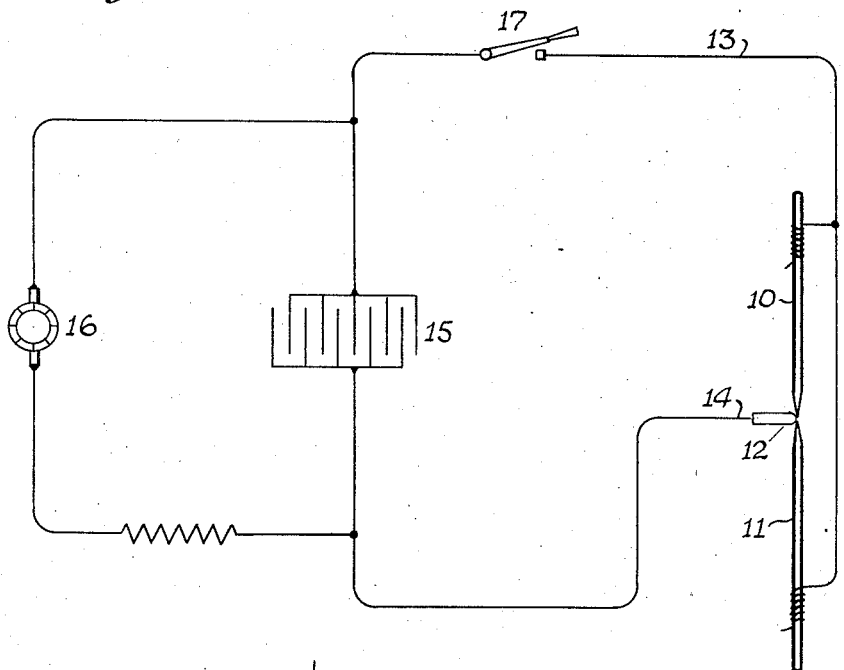
Figure 2:
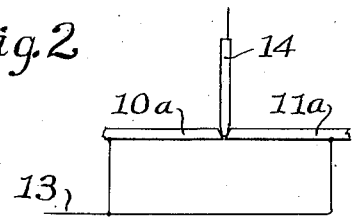

Referring to the accompanying drawing, Fig. 1 is a diagram illustrating one way of practising the invention, for welding two wires end to end;

Fig. 2 illustrates the welding of two plates edge to edge.

In the drawing, 10, 11, Fig. 1, are intended to represent any two parts (one or both composed of aluminum) which are to be welded together, as for example two wires which it is desired to join end to end. For this purpose the wires or other parts may be tapered at the points where they are to be joined and are placed one against the other in the desired position, or slightly separated. If necessary they are held in such position by a suitable insulating clamp or by any other convenient means, not shown. The two parts are also connected electrically in parallel to the terminal 13 of the source of welding current, for example a condenser 15 charged by a generator 16. The connections to the terminal mentioned should be so made as to make the resistance there at practically nil, as for example by wrapping the wires tightly together, or by clamping them firmly. This terminal of the condenser is provided with a switch 17.

The other terminal, 14, preferably of aluminum, is simply laid or held on the joint 12, touching both wires 10, 11, where the weld is to be made. The switch 17 is then closed. The discharge then takes place between the contacting terminal 14 and the two parts 10, 12, at the point where the former touches them, with the result that the sudden rush of current through these points of relatively poor conductivity produces an instantaneous rise of temperature sufficient to fuse together the contacting terminal 14 to the parts named. The terminal is then cut, leaving a small portion of it welded to 10 and 11. This procedure is repeated until sufficient metal has been deposited to build up the tapered parts to the desired thickness, after which the joint can be dressed down if necessary or desirable.

If two plates are to be joined, as 10$^a$, 11$^a$, Fig. 2, the edges thereof may be beveled on one or both sides and metal from the welding terminal 14 may be deposited in the groove or grooves in amount sufficient to fill the same, any excess being dressed off to make a smooth or flush surface if so desired.

It is to be understood that the invention is not limited to the specific details herein described but may be practised in other ways without departure from its spirit.

We claim:

1. The method of welding aluminum, comprising arranging the parts in the position in which they are to be welded and connecting the same in open circuit to one terminal of a charged condenser and connecting the other terminal of the condenser to the parts at the point where the weld is to be made; and then closing the circuit whereby the condenser discharges at such point and welds them together thereat.

2. The method of welding aluminum, comprising arranging the parts in the position in which they are to be welded and connecting the parts in parallel with each other and to a charged condenser in open circuit; arranging in contact with the parts at the joint between them a welding member connected with the other terminal of the condenser; and then closing the circuit, whereby the condenser discharges through the joint between the parts and the welding member and welds them together at such point.

In testimony whereof we hereto affix our signatures.

RALPH D. MERSHON.
PERCY A. ROSS.